US010187475B2

(12) United States Patent
Choquette et al.

(10) Patent No.: US 10,187,475 B2
(45) Date of Patent: Jan. 22, 2019

(54) METHOD AND SYSTEM FOR AUTOMATICALLY BYPASSING NETWORK PROXIES IN THE PRESENCE OF INTERDEPENDENT TRAFFIC FLOWS

(71) Applicant: Hughes Network Systems, LLC, Germantown, MD (US)

(72) Inventors: George Choquette, Germantown, MD (US); Ganeshan Ramachandran, Germantown, MD (US); Nagesh Javali, Germantown, MD (US); Rob Torres, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 188 days.

(21) Appl. No.: 14/986,588

(22) Filed: Dec. 31, 2015

(65) Prior Publication Data
US 2017/0195427 A1    Jul. 6, 2017

(51) Int. Cl.
*H01L 29/06* (2006.01)
*H04L 29/08* (2006.01)
*H04L 29/12* (2006.01)
*H04L 29/06* (2006.01)

(52) U.S. Cl.
CPC ........ *H04L 67/141* (2013.01); *H04L 61/1511* (2013.01); *H04L 61/2007* (2013.01); *H04L 67/28* (2013.01); *H04L 67/42* (2013.01); *H04L 61/6009* (2013.01); *H04L 61/6068* (2013.01)

(58) Field of Classification Search
CPC ... H04L 67/28; H04L 67/141; H04L 61/1511; H04L 61/2007

USPC ......................................................... 709/203
See application file for complete search history.

(56) References Cited

U.S. PATENT DOCUMENTS

| | | | |
|---|---|---|---|
| 6,532,493 B1* | 3/2003 | Aviani, Jr. | H04L 29/06 370/396 |
| 6,687,732 B1* | 2/2004 | Bector | H04L 29/12009 709/200 |
| 8,463,915 B1* | 6/2013 | Kim | H04L 67/1036 709/227 |
| 8,621,078 B1* | 12/2013 | Mukerji | H04L 67/2814 709/225 |
| 9,613,158 B1* | 4/2017 | Lepeska | H04L 67/104 |
| 2008/0263215 A1* | 10/2008 | Schnellbaecher | H04L 63/0281 709/229 |
| 2011/0185421 A1* | 7/2011 | Wittenstein | G06F 21/554 726/22 |

(Continued)

*Primary Examiner* — Thomas J Dailey
*Assistant Examiner* — Lam H Duong
(74) *Attorney, Agent, or Firm* — Jones Robb, PLLC

(57) ABSTRACT

A method and system for automatically bypassing a network proxy in the presence of interdependent traffic flows. Messages from a client attempting to establish communication with an origin server are monitored to detect the presence of certain state information. If the origin server is present in one or more bypass lists, the network proxy is bypassed and communication is established between the client and origin sever directly. Otherwise, communication between the client and origin server is established though the network proxy. Messages between at least the origin server and client are monitored in order to identify origin servers for which the network proxy should be bypassed. The bypass lists are automatically updated for such origin servers.

20 Claims, 14 Drawing Sheets

(56) References Cited

U.S. PATENT DOCUMENTS

| | | | | |
|---|---|---|---|---|
| 2012/0209942 A1* | 8/2012 | Zehavi | ............. | H04L 29/08729 709/213 |
| 2013/0312054 A1* | 11/2013 | Wang | ................. | H04L 63/0236 726/1 |
| 2016/0323186 A1* | 11/2016 | Dillon | ..................... | H04L 47/12 |

* cited by examiner

METHOD AND SYSTEM FOR AUTOMATICALLY BYPASSING NETWORK PROXIES IN THE PRESENCE OF INTERDEPENDENT TRAFFIC FLOWS

BACKGROUND INFORMATION

Proxy servers are well known network components that function as intermediaries between a client and an origin server. Proxy servers are widely used in data networks for performance improvement, content filtering, and network security. A proxy server will examine the contents of the resource request received from the client before passing it on, if needed, to the origin server. Normally a client is explicitly configured to use proxy servers, but in some network configurations the client is unaware of the presence of the proxy server.

Depending on the communication protocols used, not all messages exchanged between the client and the origin server are available to the proxy server. If the message that is not available to the proxy server contains state information related to resource being accessed or the identity of the client, then the state information maintained by the proxy server will be incomplete. Under such conditions, when the proxy server requests resources on the behalf the client, it will not be able to supply all information required for the origin server to retrieve the resources, thus resulting in a failure to deliver the requested resources to the client. In certain cases, this lack of state information (in the request sent by the proxy server) can cause the origin server to prompt the client to request the resources again. Since the proxy server lacks the information required by the origin server, an indefinite request loop may result.

In order to avoid indefinite request loops resulting from lack of state information, for example, all access to a specific origin server which requires state information can be bypassed. Such an approach, however, can be time consuming and unreliable. First, the client must be configured to bypass the proxy server for accesses to origin servers that require state information. The configuration is typically performed by a network operator, which can be very time-consuming and can further result in productivity disruptions. Additionally, origin servers are continually added, changed, and deleted. This can result in very time consuming efforts by the network operator to maintain an up-to-date list of such origin servers. Based on the foregoing, there is a need for an approach for automatically bypassing proxy servers for known origin servers, and automatically maintaining/updating the list of such origin servers.

BRIEF SUMMARY

A method and system are disclosed for automatically bypassing network proxies in the presence of interdependent traffic flows. According to an embodiment, the method includes: initiating a communication session with an origin server over a network; determining if messages in the communication session contain state information associated with a secure session; querying a first database for an internet protocol (IP) address of the origin server, if the messages do not contain state information, the first database containing, at least in part, one or more bypass IP addresses; establishing the communication session directly with the origin server if the messages contain state information or if the IP address of the origin server is present in the first database; establishing the communication session, via a proxy server, with the origin server if the messages do not contain state information and if the IP address of the origin server is not present in the first database; and automatically updating a second database with a symbolic name of the origin server if the communication session is established directly with the origin server, the second database containing, at least in part, one or more symbolic names.

According to another embodiment, the system includes: at least one device capable of initiating a communication session with an origin server; a terminal configured, at least in part, to facilitate communication between the at least one device and the origin server over a public network, the terminal comprising: a proxy routing unit, a proxy communication unit, a first database for storing a plurality of bypass IP addresses, and a second database for storing symbolic names of a plurality of origin servers; and a gateway for routing traffic between the terminal and the origin server via the public network, the gateway comprising: a proxy server configured to provide intermediary functions between the at least one device and the origin server, and at least one processor configured, at least in part, to manage routing operations and intermediary functions, wherein the proxy routing unit is configured to: determine if messages in the communication session contain state information associated with a secure session, query the first database for an internet protocol (IP) address of the origin server, if the messages do not contain state information, the first database containing, at least in part, one or more bypass IP addresses, establish the communication session directly with the origin server if the messages contain state information or if the IP address of the origin server is present in the first database, and automatically updating a second database with a symbolic name of the origin server if the communication session is established directly with the origin server, the second database containing, at least in part, one or more symbolic names, and wherein the proxy communication unit is configured to establish the communication session, via the proxy server, with the origin server if the messages do not contain state information and if the IP address of the origin server is not present in the first database.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A method and system for automatically bypassing network proxies in the presence of interdependent traffic flows are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
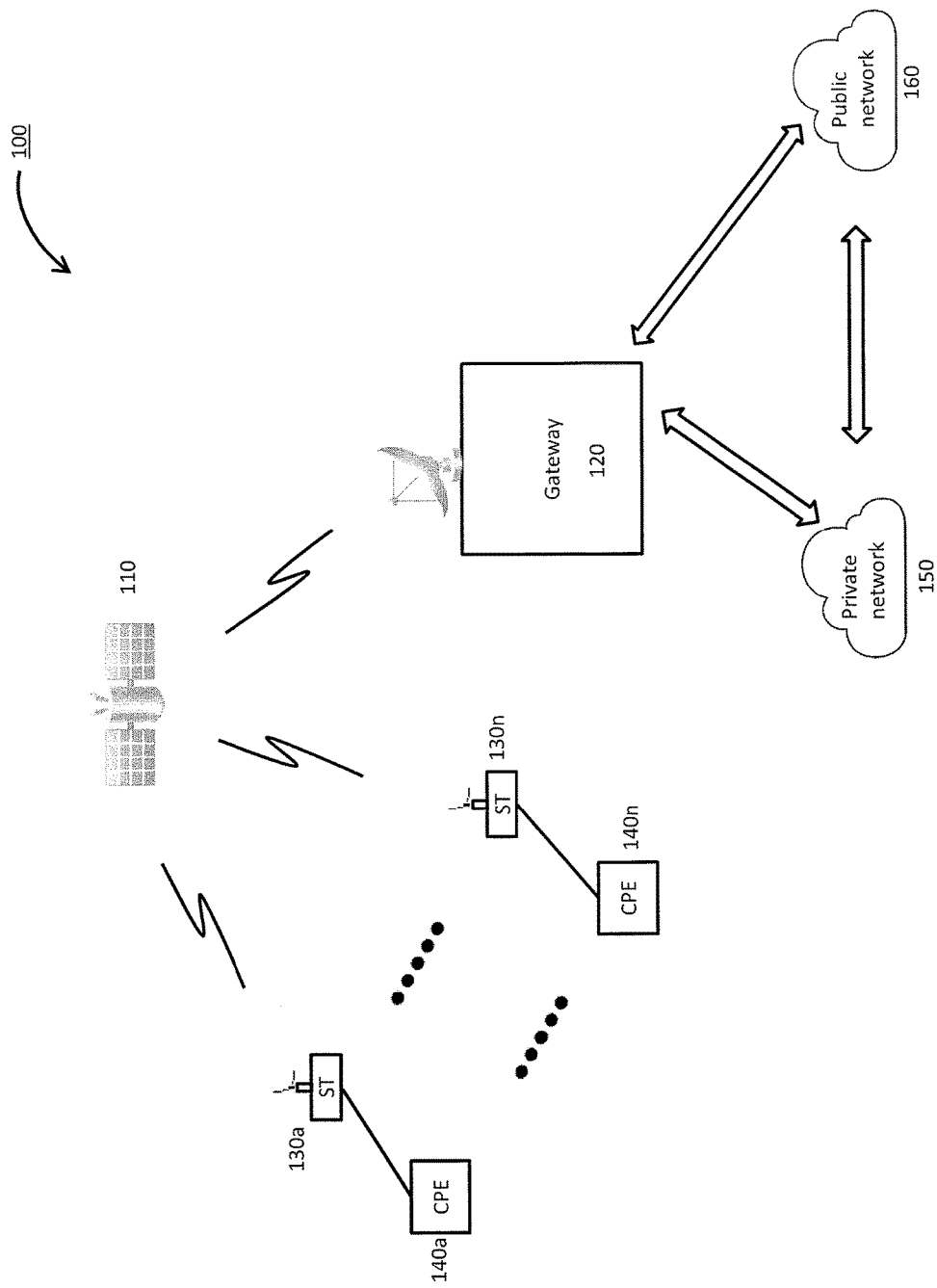
FIG. 1 is a diagram of a conventional satellite communication system capable of providing voice and data services.

FIG. 1 illustrates an exemplary satellite communication system 100 capable of providing voice and data services. The communication system 100 includes a satellite 110 that supports communications among a number of gateways 120 (only one shown) and multiple satellite terminals (STs) 130a-130n. Each satellite terminal (or terminal) 130 can be configured for relaying traffic between its customer premise equipment (CPEs) 140a-140n, a public network 150 such as the Internet, and/or from its private network 160. The gateway 120 can be configured to route this traffic across the public network 150 and private Internet 160 as appropriate. The gateway 120 can be further configured to route traffic from the public 150 Internet and private network 160 across the satellite link to the appropriate terminal 130. The terminal 130 then routes the traffic to the appropriate customer premise equipment (CPE) 140.

As illustrated in FIG. 1, the satellite communication system 100 facilitates communication between a satellite network, public communication networks 150, and private communication networks 160. Various embodiments, however, can also be configured for providing communication within only a terrestrial network (e.g., public communication networks 150 and private communication networks 160), or within only a satellite network. Thus, while components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
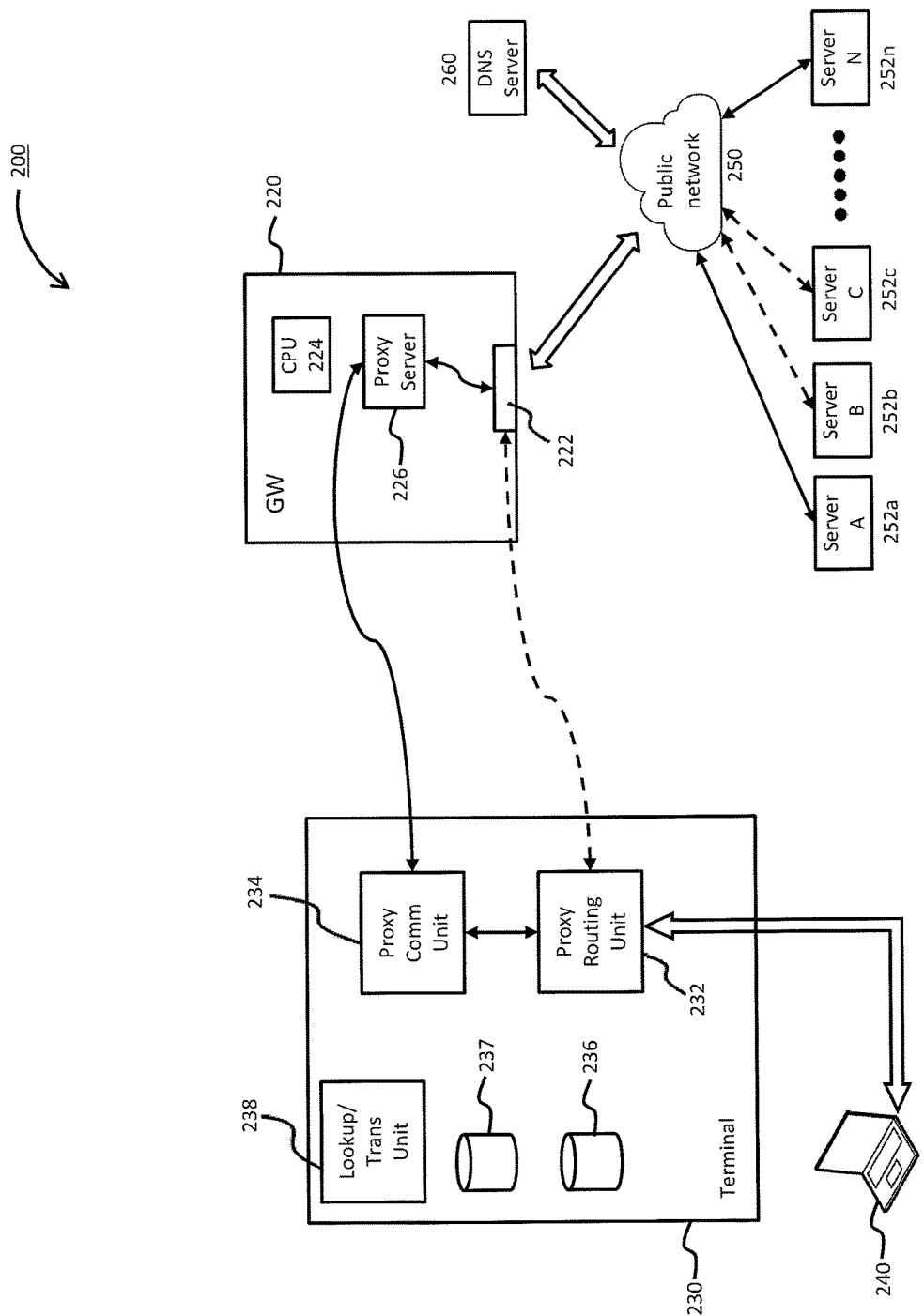
FIG. 2 is a diagram of a system capable of automatically bypassing network proxies in accordance with at least one embodiment.

FIG. 2 is a diagram of a system capable of automatically bypassing network proxies in accordance with at least one embodiment. The system includes a terminal 230 that is used to facilitate communication by various client devices 240 such as the illustrated laptop computer. The system further includes a gateway 220 which establishes communication between the client device 240 and various origin servers 252a-252n (or simply servers) using a public network 250, such as the internet. The gateway 220 can also establish communication with a domain name system (DNS) server 260. According to at least one embodiment, the gateway 220 can include one or more ports 222 through which traffic can be exchanged with the public network 250. The gateway 220 can include, at least in part, one or more processors (or CPUs) 224 and a proxy server 226. The CPU 224 can be configured to perform various processing tasks, such as identifying messages that should be directed to the proxy server 226 and messages that should bypass the proxy server 226. While FIG. 2 shows a single gateway 220, it should be appreciated that additional gateways may be provided at different points within the system 200.

According to the illustrated embodiment, the terminal 230 can be configured, at least in part, to facilitate communication between the client device 240 and one or more origin servers 252. As will be discussed in greater detail below, the client device 240 can establish one type of communication session with origin server A 252a, while establishing a different type of communication session with origin server B 252b and origin server C 252c. The terminal 230 can include, for example, various components which assist in determining the type of communication session that should be established between the client device 240 and the origin server 252. According to the illustrated embodiment, the terminal 230 includes a proxy routing unit 232, a proxy communication unit 234, a first database 236, a second database 237, and an address lookup/translation unit 238.

According to at least one embodiment, the proxy routing unit 232 can be configured to interact with the client device 240 in order to determine if, and when, the client device 240 is initiating a communication session with an origin server 252. Upon detecting that the client device 240 is attempting to initiate a communication session, the proxy routing unit 232 monitors messages from the client device 240 in order to determine whether such messages contain any state information. According to at least one embodiment, the state information can correspond to the type of communication session being established. For example, the communication session can be either secure (e.g., HTTPS) or nonsecure (e.g., HTTP). According to further embodiments, the state information can provide details regarding specific protocols that should be utilized during the communication session.

According to at least one embodiment, the proxy routing unit 232 can monitor specific transmission control protocol (TCP) ports being opened for different communication sessions in order to infer certain state information. For example, if the communication session is initiated over TCP ports such as port 80 or 8080, then the proxy routing unit 232 can conclude that a nonsecure hypertext transfer protocol (HTTP) communication session is being established If the communication session is initiated over TCP port 443, then the proxy routing unit 232 can determine that the communication session will be secure, and state information may be included. While TCP ports 80, 8080, and 443 have been selected for the exemplary embodiment, it should be appreciated that various other TCP ports can provide an indication as to whether or not the communication session will be secure or non-secure. For example, certain ports can be used by well-known applications that establish a consistent type of communication session. If the communication session is consistently secure, the use of such TCP ports would give a presumption that a secure communication session is being established. Furthermore, unassigned ports can be assigned or reassigned universally. Accordingly, TCP ports 80 and 8080 should not be considered as the only nonsecure ports, and TCP port 443 should not be considered the only secure port. According to one or more embodiments, the proxy routing unit 232 can examine the IP address contained within the message in order to determine whether the IP address corresponds to an origin server 252 which requires the exchange of various state information.

According to the embodiment illustrated in FIG. 2, the first database 236 can be configured to store a plurality of bypass IP addresses. The bypass IP addresses correspond to IP addresses of origin servers 252 that are known to require the exchange of various types of state information and/or require secure communication sessions. The first database 236 can further be configured to store IPv4 and/or IPv6 addresses. The second database 237 can be configured to store the symbolic names of different origin servers 252 that are known to require state information and/or secure communication sessions. According to one or more embodiments, the proxy routing unit 232 can be configured to interact with the first database 236 in order to determine whether or not the IP address included in the message from the client device 240 corresponds to that of an origin server 252 which requires state information. More particularly, the proxy routing unit 232 queries the first database 236 in order to determine whether or not the IP address is present. If the IP address is present, then the proxy routing unit 232 determines that the client device 240 is attempting to establish a communication session with an origin server 252 that requires the exchange of state information, or a secure connection.

According to at least one embodiment, if the client device 240 is attempting to establish a communication session with an origin server 252 that requires the exchange of state information, then the proxy routing unit 232 forwards the messages directly to the origin server 252. As illustrated in FIG. 2, origin server B and origin server C require the exchange of state information. Thus, the communication session is established directly to those origin servers 252 via the gateway 220. The path of messages in this communication session is illustrated by the dashed lines. Thus, messages from the proxy routing unit 232 are transmitted by the terminal 230 to the gateway 220. The gateway 220 forwards these messages directly to the origin servers 252 using one of the communication ports 222.

According to the illustrated embodiment, messages that do not specify an origin server 252 requiring the exchange of state information are forwarded to the proxy communication unit 234. According to at least one embodiment, the proxy communication unit 234 establishes the communication session via the proxy server 226, if the proxy routing unit 232 determines that the origin server's IP address is not present in the first database 236 and if the messages do not contain state information. More particularly, the proxy routing unit 232 forwards such messages to the proxy communication unit 234, which in turn forwards the messages to the proxy server 226 and subsequently to origin server A 252a. According to at least one embodiment, the messages are transmitted by the terminal 230 to the gateway 220. The CPU 224 can be configured to examine such messages to determine if they are being sent by the proxy communication unit 234. The CPU 224 would subsequently forward such messages to the proxy server 226. The proxy server 226 then transmits the messages, via one of the ports 222, to origin server A 252a.

According to one or more embodiments, the proxy communication unit 234 can be configured to monitor messages and/or state information transmitted from any of the origin servers 252 during the communication session. This allows the proxy communication unit 234 to determine whether or not a particular communication session should bypass the proxy server 226. For example, if an origin server 252 that requires the exchange of state information is encountered for the first time, the proxy routing unit 232 has no indication that the origin server 252 will require an exchange of state information. This can occur because the origin server 252 is newly encountered, and its IP address is not available within the first database 236. The proxy routing unit 232 would therefore forward messages pertaining to the communication session to the proxy communication unit 234 so that the communication session can be established through the proxy server 226.

According to at least one embodiment, the origin server 252 may transmit a message that indicates the communication session should be established with a different origin server 252. For example, the origin server 252 may return a message, such as a 3xx message specifying that access via HTTPS is required in order to complete a request from the client device 240. According to one or more embodiments, the proxy communication unit 234 can examine the 3xx response, or any error messages, in order to determine whether or not it contains the address of a different origin server 252. The proxy communication unit 234 can further store the symbolic name of the different server within the second database 237. Additionally, the proxy communication unit 234 can store the IP address of the new origin server 252 within the first database 236. According to one or more embodiments, the proxy communication unit 234 can communicate with the address lookup/translation unit to request translation of a symbolic name for an origin server 252 to the IP address and vice versa. Similarly, the proxy routing unit 232 can obtain translations between IP addresses and symbolic names by using the address lookup/translation unit.

Prior to forwarding a message to the proxy server 226, various embodiments allow the proxy communication unit 234 to query the second database 237 to determine the presence of the symbolic name of the origin server 252. If the symbolic name of the origin server 252 is not available from the message, the proxy communication unit 234 can request a translation of the IP address to the symbolic name from the address lookup/translation unit. If the symbolic name of the origin server 252 is present in the second database 237, then the proxy communication unit 234 can optionally store the IP address within the first database 236. If the symbolic name of the origin server 252 is present in the second database 237, such an indication can be made to the proxy routing unit 232 so that subsequent messages can be transmitted directly to the origin server 252. Alternatively, other embodiments allow for the proxy communication unit 234 to simply update the first database 236 and forward the messages to the proxy server 226. Upon receiving an error or 3xx status response, the client device 240 would retransmit the request to establish the communication session. At this point, the proxy routing unit 232 would detect the IP address of the origin server 252 which was recently added to the first database 236. The proxy routing unit 232 would then forward the message directly to the origin server 252 and bypass the proxy server 226.

Figure 3:
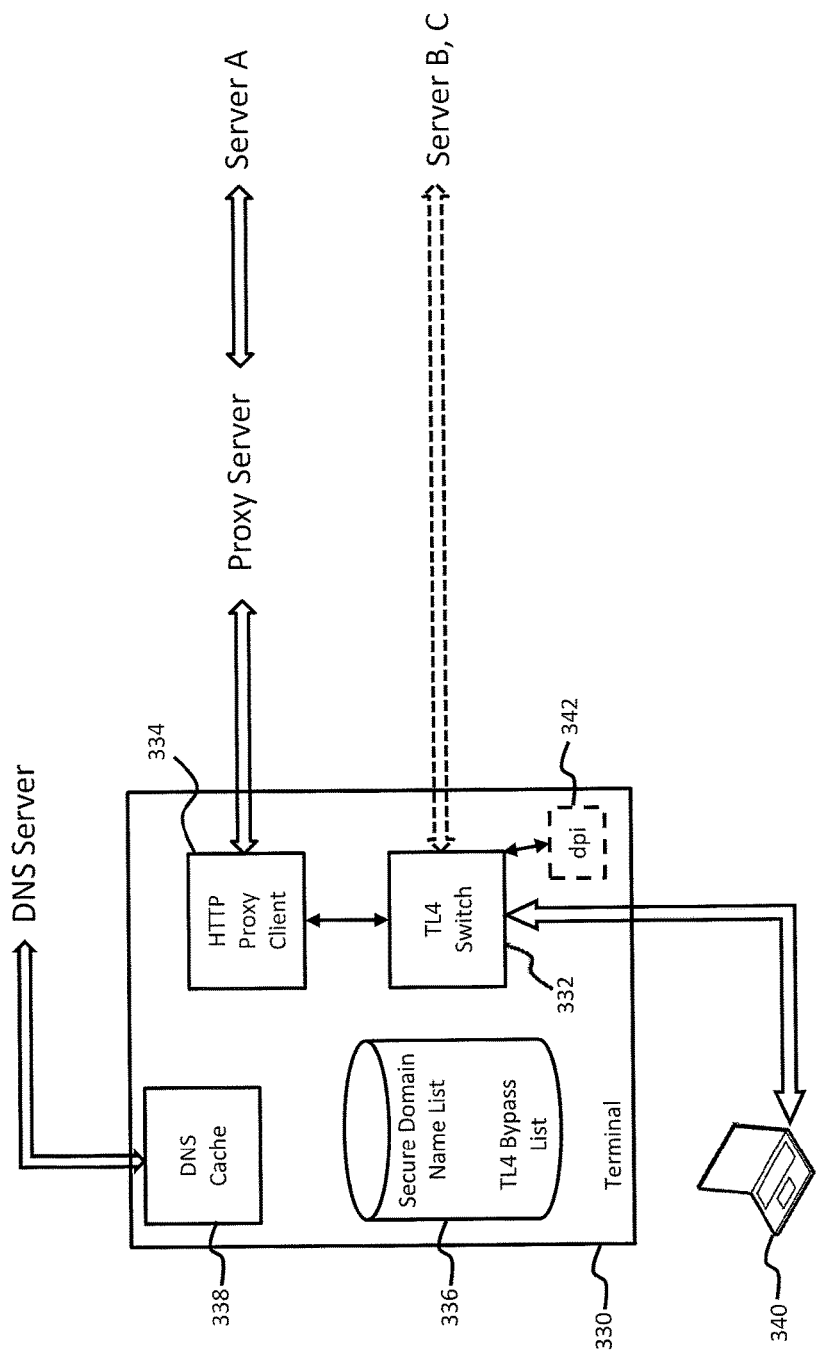
FIG. 3 is a diagram of a terminal configuration, according to one or more embodiments.

FIG. 3 is a diagram of a terminal configuration, according to one or more embodiments. The terminal 330 includes a transport layer 4 (TL4) switch 332, and HTTP proxy client 334, a database 336, and a DNS cache 338. The TL4 switch 332 can be configured, at least in part, to perform various functions that are similar to those provided by the proxy routing unit. In addition, the TL4 switch 332 can perform additional switching operations that are specific to layer 4 of the open systems interconnections (OSI) model. According to an embodiment, the TL4 switch 332 can monitor message transmissions from the client device 340 in order to determine if a communication session is being established with an origin server. The TL4 switch 332 can further examine the messages in order to determine whether or not they contain state information and/or if they should bypass the proxy server and be transmitted directly to the origin server.

The proxy client 334 can be configured to allow the client device 340 to establish a communication session with the origin server via the proxy server. According to the embodiment illustrated in FIG. 3, the database 336 can be configured to store various information, including at least a secure domain name list and a TL4 bypass list. The secure domain name list consists of the symbolic names of a plurality of origin servers that are known to require the exchange of state information. The TL4 bypass list contains the IP addresses of origin servers that are known to require the exchange of state information and/or secure communication. According to one or more embodiments, the TL4 bypass list can be configured to store IPv4 and/or IPv6 addresses. Thus, the TL4 switch 332 can query the database 336 in order to determine whether a particular IP address specified by the client device 340 corresponds to the IP address of an origin server that is contained within the TL4 bypass list. Similarly, the proxy client 334 can query the database 336 in order to determine whether the symbolic name of an origin server is present in the secure domain name list.

According to the embodiment illustrated in FIG. 3, the DNS cache 338 can store information necessary for translating between symbolic names and IP addresses for different origin servers. According to further embodiments, the DNS cache 338 can store information necessary for translating between symbolic names and IP addresses for various devices and terminals that are unrelated to communication sessions being initiated by the client device 340. Furthermore, if the proxy client 334 or TL4 switch 332 require translation of a symbolic name and/or IP address that is not stored within the DNS cache 338, then the DNS cache 338 can submit such a request to an external DNS server.

Figure 4A:
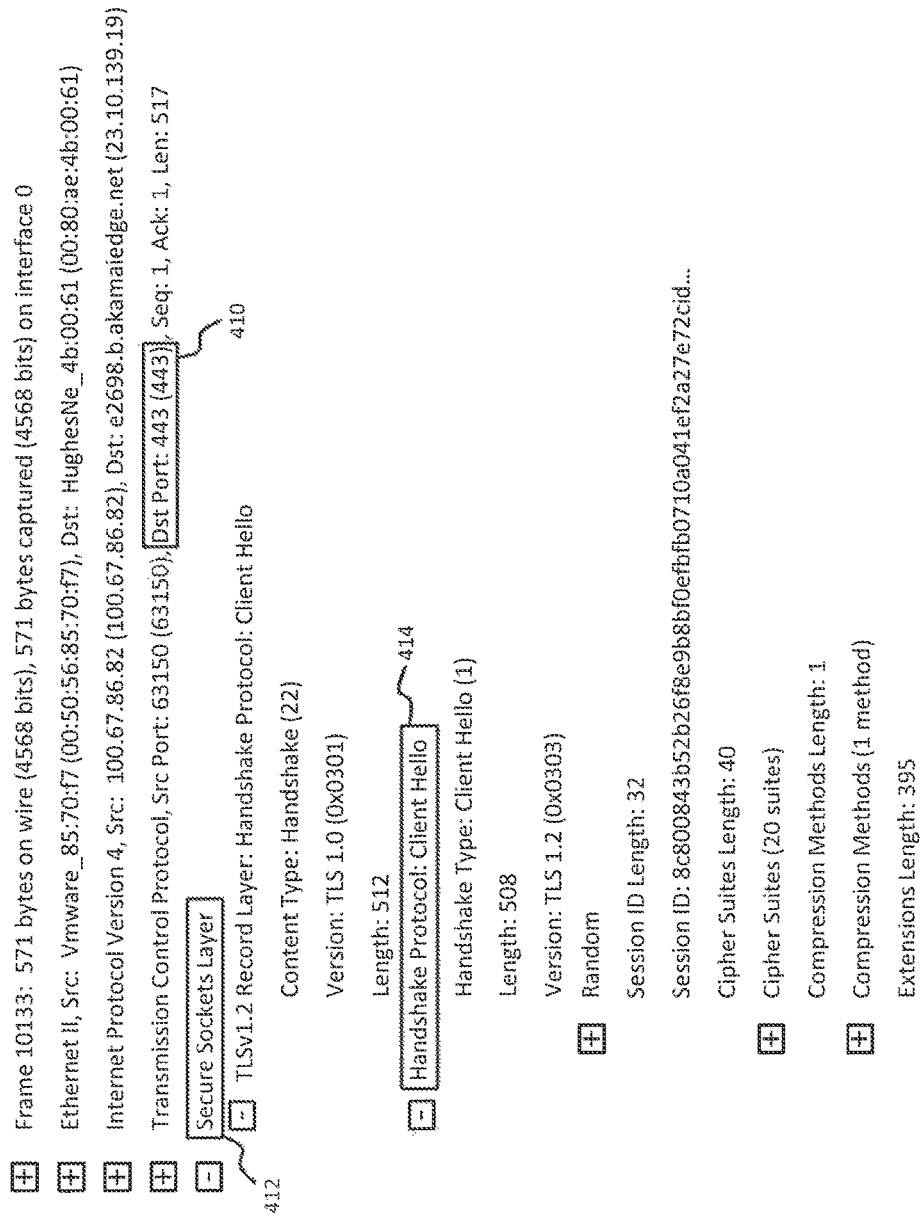
FIGS. 4A and 4B are a diagram illustrating contents of a physical layer capture during an SSL communication session, according to one embodiment.
Figure 4B:
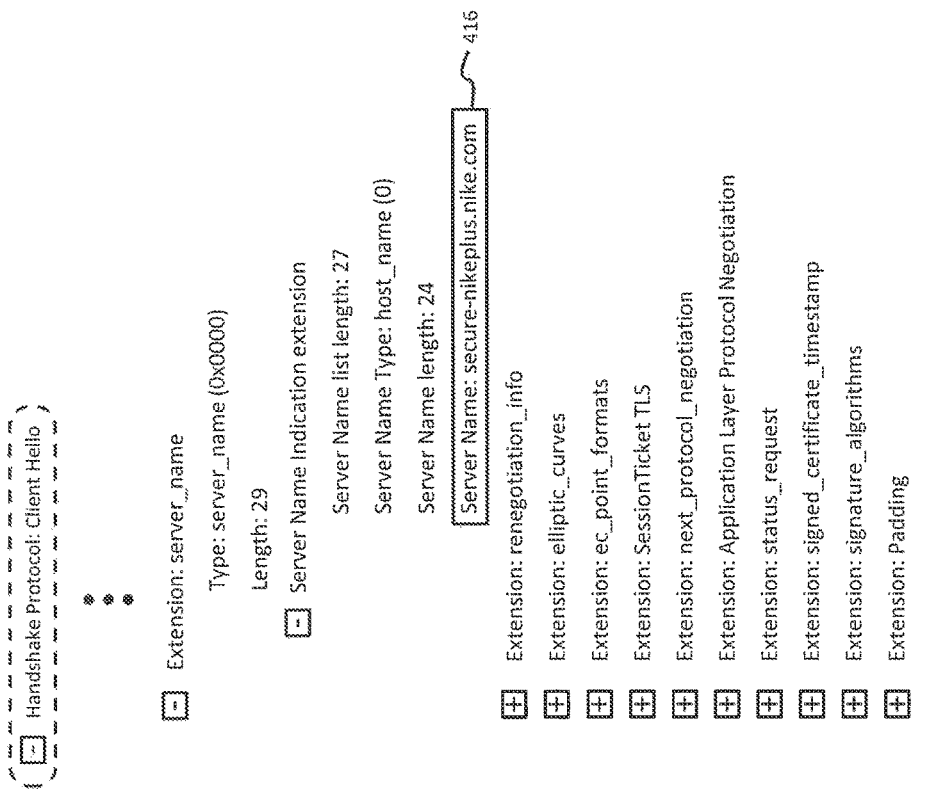

According to at least one embodiment, the TL4 switch 332 can monitor the port being used by the client device 340 to initiate the communication session. More particularly, the TL4 switch 332 will typically include a function of switching the port number for different types of communication sessions. Thus, the TL4 switch 332 can monitor the specific port which must be opened in order to establish the communication session. If the communication session utilizes a secure port, such as port 443, then the TL4 switch 332 can further examine the messages in order to determine the type of connection being established Referring additionally to FIGS. 4A and 4B, the TL4 switch 332 can examine the message header to determine the type of protocol being used. As illustrated in FIG. 4A, the physical layer capture includes a destination port field 410 which specifies that port number 443 is being used for the message. The capture also includes field 412 which specifies that secure sockets layer protocol is being used, and a handshake protocol field 414 which indicates that a client hello will be used. According to an embodiment, the TL4 switch 332 can further examine the message to determine if a client hello is being transmitted with the message. If a client hello is being used, then the TL4 switch 332 can examine the server name field 416 in order to identify the symbolic name of the origin server being used in the communication session. The TL4 switch 332 can subsequently update the secure domain name list with the symbolic name of the origin server and/or update the TL4 bypass list with the IP address of the origin server.

Figure 5A:
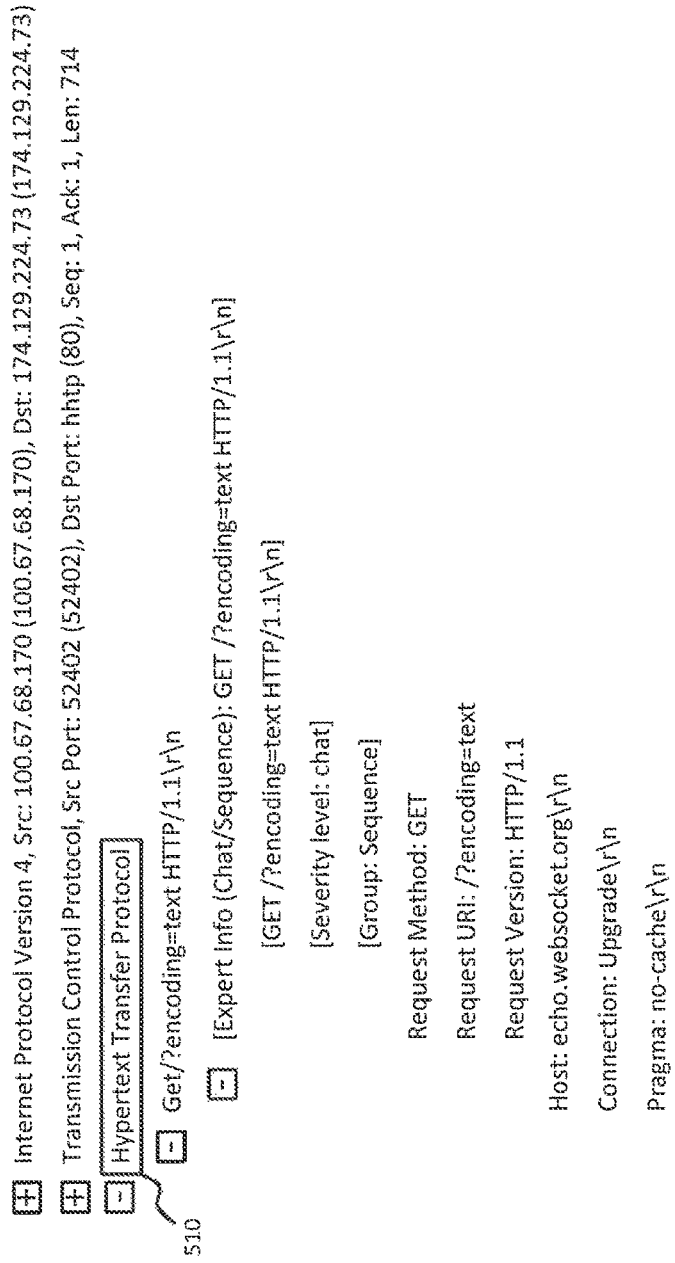
FIGS. 5A and 5B are a diagram illustrating contents of a physical layer capture during deep packet inspection (DPI), according to one embodiment.
Figure 5B:
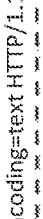

According to at least one embodiment, the proxy client 334 can be configured to perform a deep packet inspection (DPI) on messages being transmitted to the proxy server. Referring additionally to FIGS. 5A and 5B, the physical layer capture illustrates some of the information available to the proxy client 334 during such an inspection. In addition to identifying the base protocol in field 510, the DPI can reveal if an upgrade field 512 is present and extract its contents. According to at least one embodiment, the upgrade field can specify upgraded protocols that may support secure communication. As previously discussed, secure communication sessions often require the exchange of state information with the origin server. Consequently, such communication sessions should bypass the proxy server and be established directly between the client device 340 and the origin server. According to further embodiments, the terminal 330 can include a DPI unit 342 that is specifically designed and configured to optimize inspection of packets being transmitted. The DPI unit 342 can forward the results of all packet inspections to the TL4 switch 332. Optionally, the DPI unit 342 can be configured with certain parameters so that only inspection results which satisfy the parameters are sent to the TL4 switch 332.

According to the exemplary embodiment, the message specifies an upgrade to a web sockets or HTTP/2 protocol which may inherently support secure communications. The proxy client 334 can further extract the content of the origin field 514 in order to identify the symbolic name of the origin server. According to one or more embodiments, the proxy client 334 can update the first database 336 with the IP address of the origin server. As previously discussed, the proxy client 334 can request translation of the symbolic name extracted from the message packet from the DNS cache 338. Thus, the DNS cache 338 would return the IP address corresponding to the symbolic name of the origin server. The proxy client 334 can then insert the IP address within the TL4 bypass list. According to one or more embodiments, the proxy client 334 can further update the secure domain name list with the symbolic name retrieved from the origin field 514.

Figure 6:
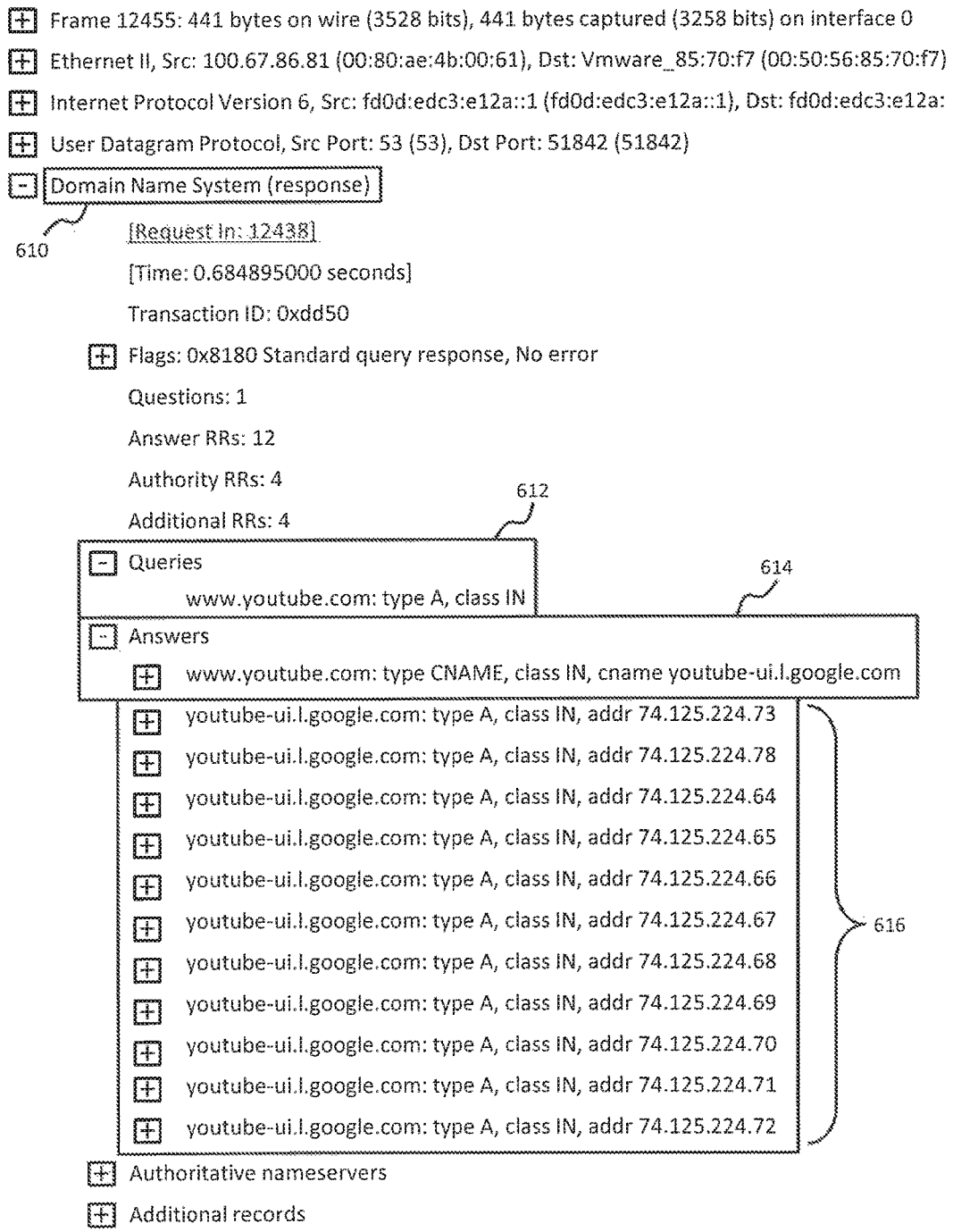
FIG. 6 is a diagram illustrating contents of a physical layer capture during a DNS query response, according to one embodiment.

According to an embodiment, the DNS cache 338 can be configured to monitor responses received from DNS servers. Referring additionally to FIG. 6, the physical layer capture shows that such messages can include a field 610 which identify the message as a DNS response. The message further includes a query field 612 which identifies the symbolic name submitted as part of the request to the DNS server. The message also includes an answer field 614 which contains the canonical name (CNAME) of the origin server as well as one or more IP addresses 616 associated with the CNAME. According to various embodiments, the DNS cache 338 extracts the CNAME and corresponding IP addresses (or addresses). The DNS cache 338 then adds the CNAME to the secure domain name list. According to at least one embodiment, the DNS cache 338 can further add the one or more corresponding IP addresses to the TL4 bypass list.

The TL4 switch 332 can be configured to implement an aging policy for entries in both the TL4 bypass list as well as the entries in the secure domain name list. According to various embodiments, the TL4 switch 332 can be configured to monitor and/or track usage frequency of entries in the TL4 bypass list and secure domain name list using hit count statistics. Every time the TL4 switch 332 performs an address lookup and obtains a successful match, the hit count (for that specific entry) is incremented. Similarly, every time a lookup of the secure domain name list by HTTP proxy client 334 results in a match, a corresponding hit count is incremented. Periodically, the hit counts of entries in the TL4 bypass list are checked against a configurable threshold. Entries with hit counts less than the threshold can be deleted from the TL4 bypass list. Hit counts that are above threshold, can be reset to track the usage for the next polling cycle. A similar operation can also be performed for entries in the secure domain name list. According to various embodiments, the threshold value used in the TL4 bypass list can be independently set from the threshold value used in the secure domain name list. Furthermore, the polling cycle for each list can also be independently set.

Figure 7:
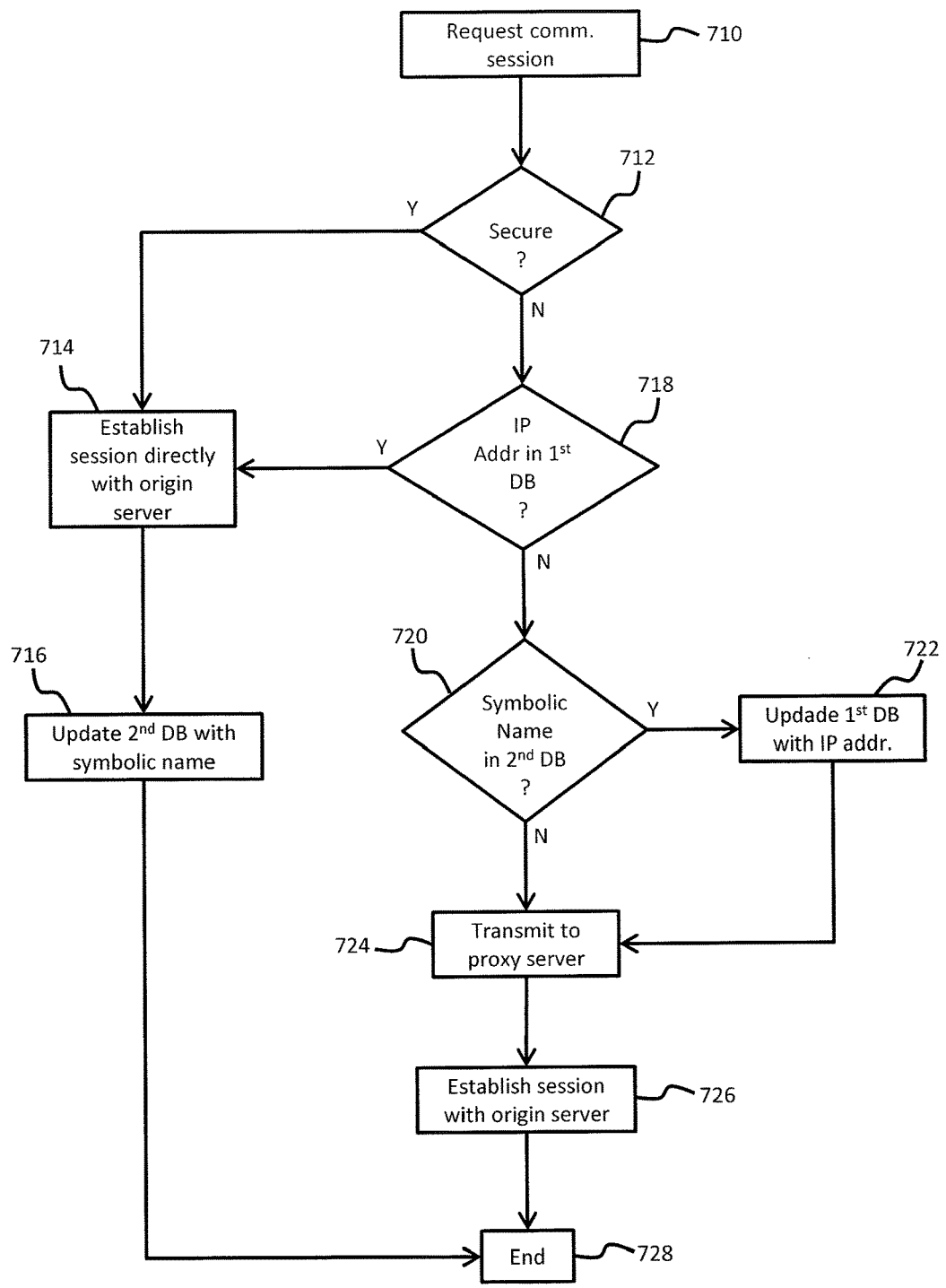
FIG. 7 is a flowchart of a process for automatically bypassing network proxies, according to at least one embodiment.

FIG. 7 is a flowchart of a process for automatically bypassing network proxies, according to at least one embodiment. At 710, a request for establishing a communication session is transmitted. This corresponds, for example, to the client device transmitting a command to initiate a communication session with an origin server. At 712, a test is performed to determine whether the communication session is secure or not. This can correspond, for example, to the proxy routing unit or TL4 switch determining if the messages contain state information or specifies a request for secure communications. If it is determined that the communication session will be secure, then the communication session is established directly with the origin server, and bypasses the proxy server. At 716, the symbolic name of the origin server is added to the second database.

If the communication session is not secure, then at 718, it is determined if an IP address of the origin server is in the first database. This can correspond, for example, to the proxy routing unit or TL4 switch querying the first database or TL4 bypass list, respectively, in order to detect the existence of the origin server's IP address. If the IP address is present in the first database, then the communication session is established directly with the origin server at 714. If the IP address is not present in the first database then the second database is queried in order to determine if the symbolic name of the origin server is present. This is done at 720. If the symbolic name of the origin server is present in the second database, then the first database is updated with the IP address of the origin server at 722. Control then passes to 724. If the symbolic name of the origin server is not present in the second database, then messages are transmitted to the proxy server at 724. At 726, the proxy server transmits the messages to the origin server, thereby establishing the communication session with the origin server. The process ends at 728.

Figure 8A:
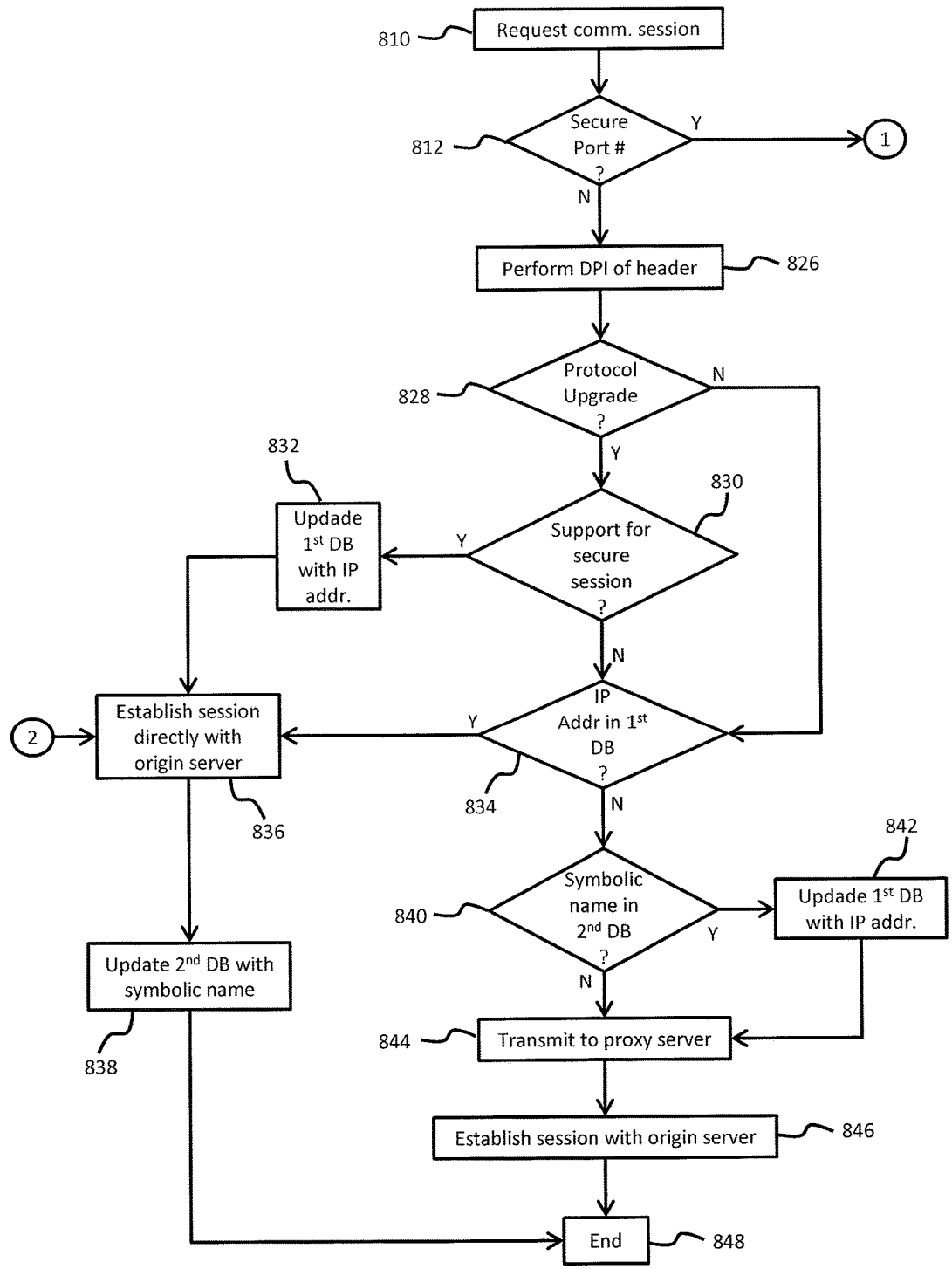
FIGS. 8A and 8B are a flowchart of a process for automatically bypassing network proxies, according to one or more embodiments.
Figure 8B:
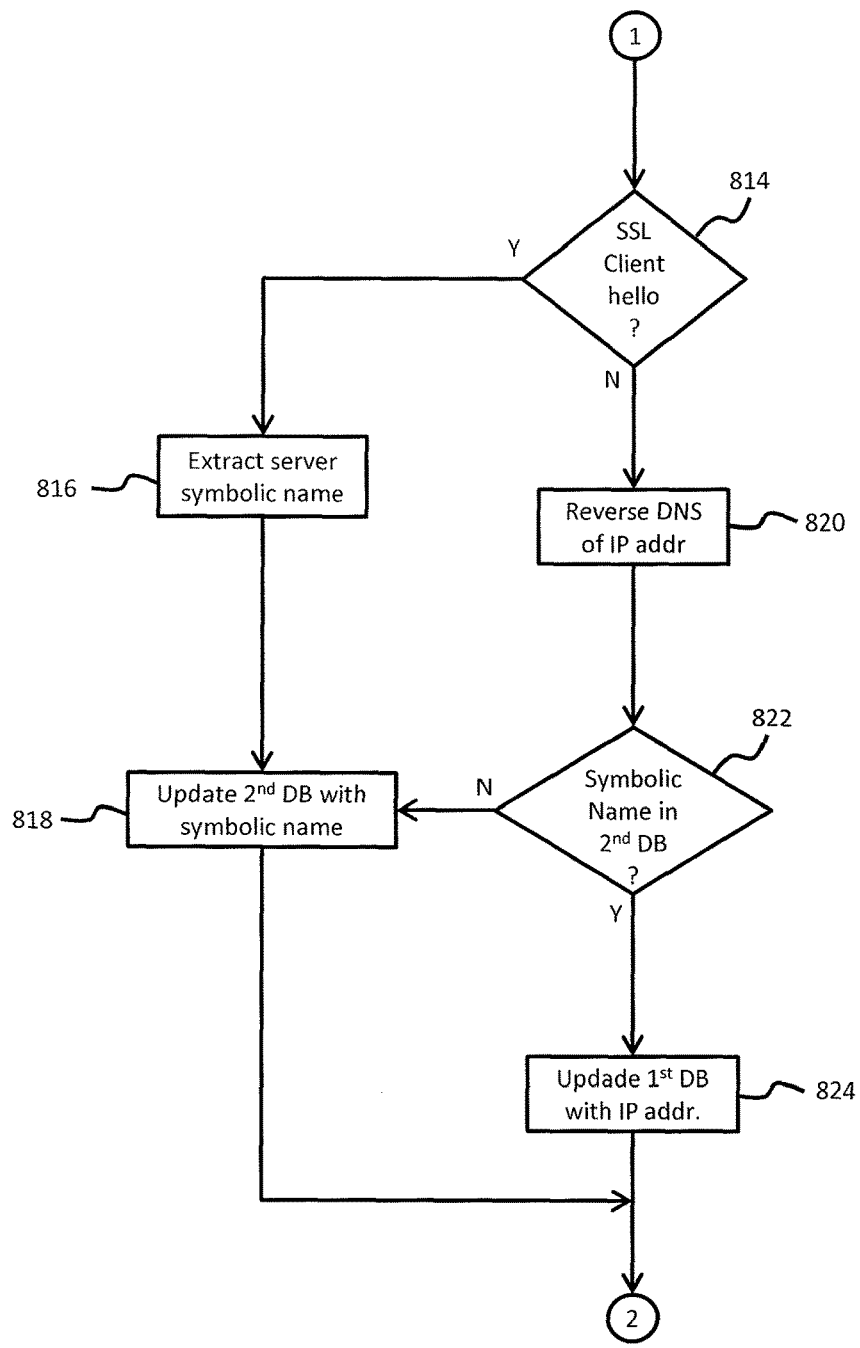

FIGS. 8A and 8B are a flowchart of a process for automatically bypassing network proxies, according to one or more embodiments. At 810, a request to establish a communication session is received. At 812, it is determined whether the communication session will be using a secure port. According to at least one embodiment, the TL4 switch (or proxy routing unit) can monitor messages being transmitted as part of the request in order to determine which TCP port will be used. For example, if port number 443 is specified, control passes to branch one. With additional reference to FIG. 8B, at 814, it is determined whether the request contains an SSL client message. If the request includes a client hello message, then at 816, the symbolic name of the origin server is extracted from the server name field. At 818, the second database is updated with the symbolic name of the origin server.

If an SSL connection is not being established, then a reverse DNS query is submitted for the IP address of the origin server at 820. According to at least one embodiment, the DNS cache can be used to fulfill this request. If the IP address of the origin server is not available in the DNS cache, then the DNS cache can submit a query to an external DNS server. At 822, a test is performed to determine if the symbolic name of the origin server is present and the second database. If the symbolic name is not present, then it is added to the second database at 818. If the symbolic name of the origin server is present in the second database, then the first database is updated with the IP address of the origin server 824. Control then returns the branch 2.

If it is determined, at 812, that a secure port number will not be used for the communication session, then control passes to 826 where a DPI of the header is performed. At 828, the contents of the header are examined in order to determine whether a protocol upgrade has been specified. If no protocol upgrade is specified, then control passes to 834. If a protocol upgrade is specified, then it is determined if the upgraded protocol provides support for a secure session at 830. If the upgraded protocol supports secure sessions, then the first database (or TL4 bypass list) is updated with the IP address of the origin server at 832. The communication session is then established directly with the origin server.

If the upgraded protocol does not provide support for secure communication sessions, or no protocol upgrade exists, control passes to 834. The first database is queried in order to determine if the IP address of the origin server is present. If the IP address of the origin server is present in the first database, then control passes to 836 where the communication session is established directly with the origin server. If the IP address of the origin server is not present in the first database, then the second database is queried for the presence of the symbolic name of the origin server at 840. If the symbolic name of the origin server is present in the second database, then the corresponding IP address is added to the first database at 842. Control then passes to 844. If the symbolic name of the origin server is not present in the second database, then messages are transmitted to the proxy server at 844. The proxy server subsequently forwards the messages to the origin server, at 846, thereby establishing the communication session with the origin server. The process ends at 848.

Figure 9:
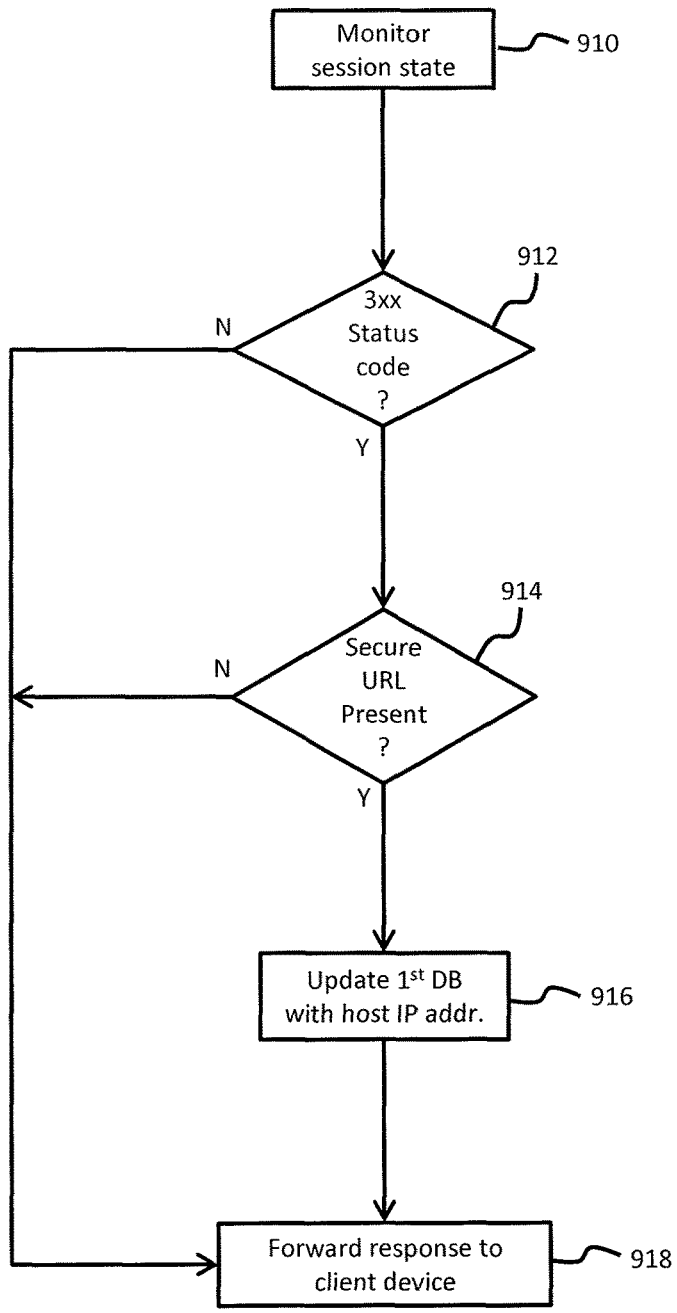
FIG. 9 is a flowchart of a process for determining if a network proxy should be bypassed, according to one or more embodiments.

FIG. 9 is a flowchart of a process for determining if a network proxy should be bypassed, according to one or more embodiments. At 910, state information for the communication session is monitored. This can correspond, for example, to the proxy client or proxy communication unit monitoring certain information contained in messages (e.g., HTTP response messages with 3xx status codes) exchanged between the client device and the origin server. At 912, it is determined whether any response messages contain a 3xx status code. If the response messages do not contain a 3xx status code, then control passes to 918. If it is determined, at 912, that the response messages contain a 3xx status code, then control passes to 914, where it is determined if a secure uniform resource locator (URL) is present in the message. If the 3xx response includes a secure URL, then control passes to 916. If a secure URL is not present, then control passes to 918. At 916, the first database is updated with the IP address corresponding to the URL from the response. At 918, the responses (or response messages) are forwarded to the client device.

While FIGS. 7-9 illustrate various embodiments for determining whether the communication session should be established directly with the origin server (i.e., bypassing the proxy server), it should be noted that such features do not require sequential steps as set forth in the illustrated embodiment. Rather, various embodiments allow for independent performance of certain tests to determine if a communication session should be established directly with the origin server. For example, state information and 3xx responses can be independently and/or simultaneously monitored by either the proxy client or the proxy communication unit. Furthermore, any combination of these features can be used to further determine whether the communication session should be established directly with the origin server. For example, only state information may be monitored, only 3xx information can be monitored, only responses from DNS queries can be monitored, or any combination thereof. Thus, the features illustrated in the Figures should be considered illustrative, and not restrictive.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
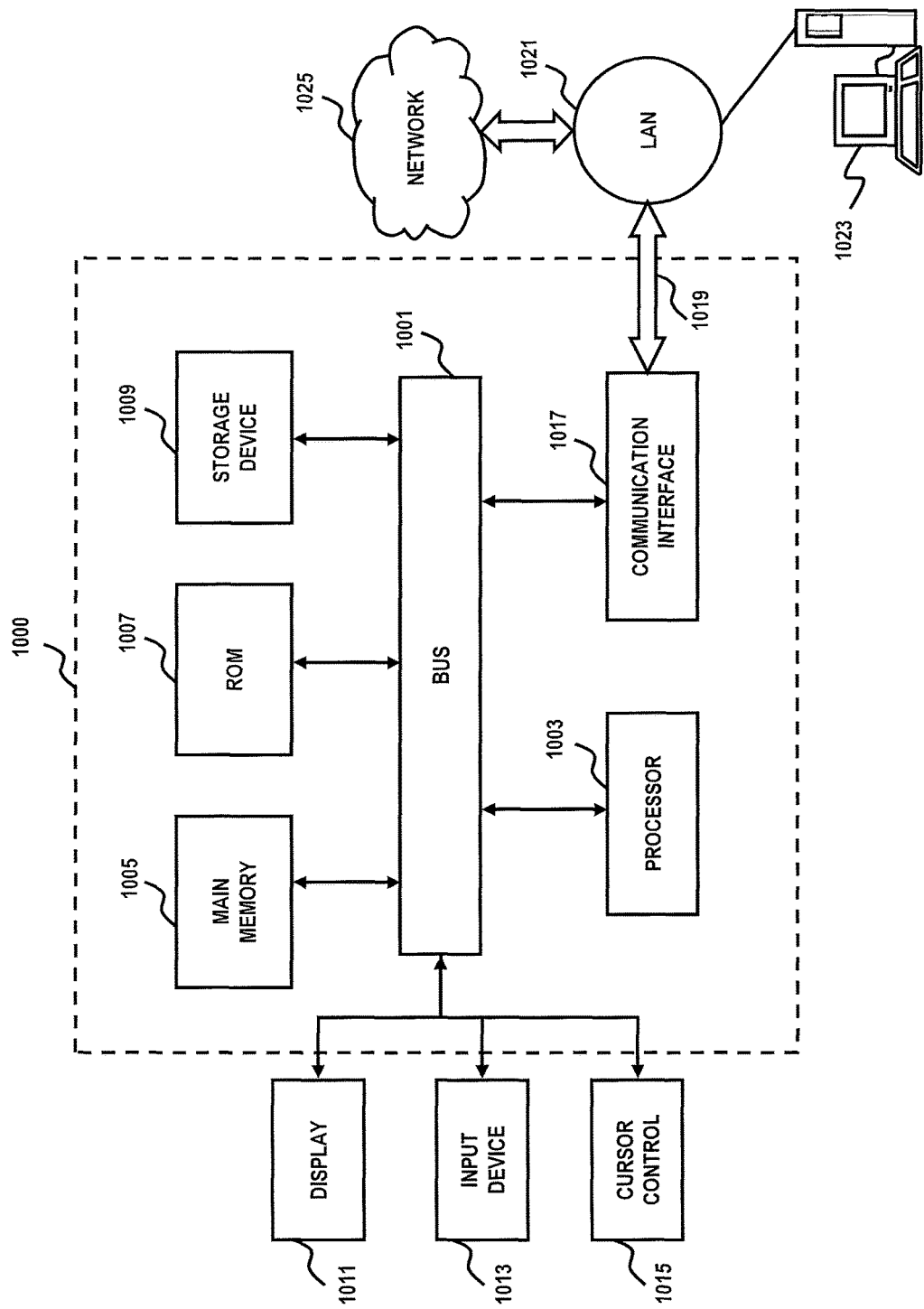
FIG. 10 is a diagram of a computer system that can be used to implement various exemplary embodiments.

FIG. 10 is a diagram of a computer system that can be used to implement various embodiments. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Non-volatile media can further include flash drives, USB drives, microSD cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 11:
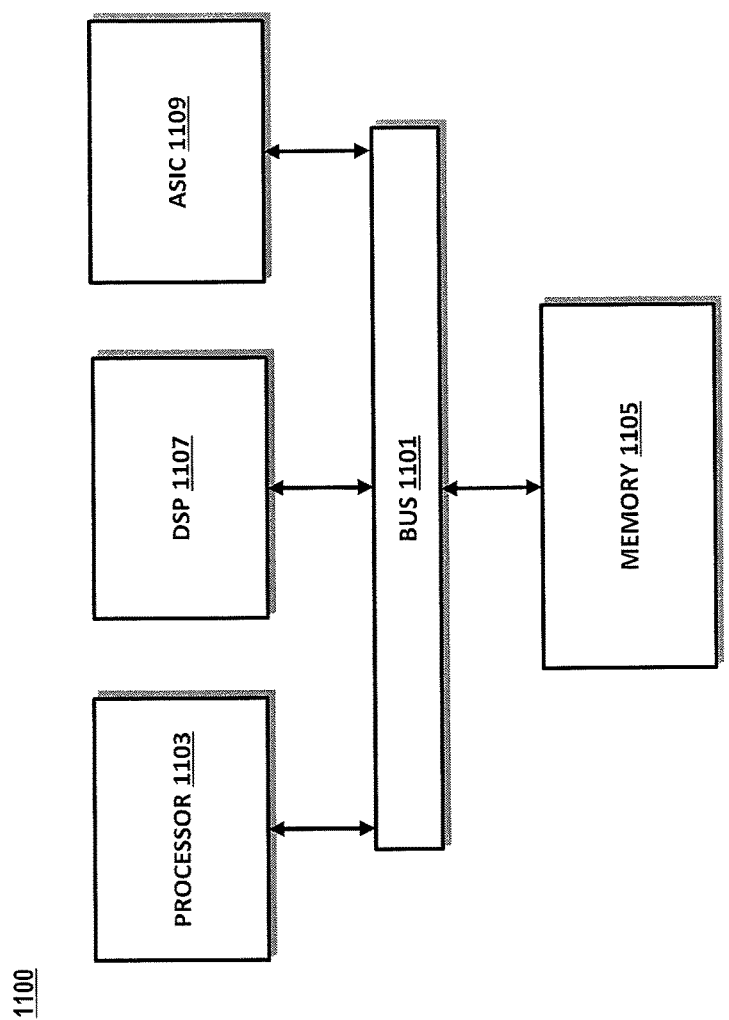
FIG. 11 is a diagram of a chip set that can be used to implement various exemplary embodiments.

FIG. 11 illustrates a chip set 1100 upon which an embodiment of the invention may be implemented. Chip set 1100 is programmed to implement various features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   initiating, by a client device, a communication session with an origin server;
   determining, by a terminal facilitating communication between the client device and a remotely located gateway over a first network, if messages in the communication session contain state information associated with a secure session;
   querying a first database within the terminal for an internet protocol (IP) address of the origin server, if the messages do not contain state information, the first database containing, at least in part, one or more bypass IP addresses;
   establishing the communication session directly with the origin server via the gateway and over a public network if the messages contain state information or if the IP address of the origin server is present in the first database;
   establishing the communication session, via a proxy server within the gateway and over the public network, with the origin server if the messages do not contain state information and if the IP address of the origin server is not present in the first database; and
   automatically updating a second database within the terminal with a symbolic name of the origin server if the communication session is established directly with the origin server, the second database containing, at least in part, one or more symbolic names.

2. The method of claim 1, wherein establishing the communication session via a proxy server further comprises:
   querying the second database for the symbolic name of the origin server; and
   automatically updating the first database with the IP address of the origin server if the symbolic name is present in the second database.

3. The method of claim 1, further comprising:
   detecting an incomplete state message resulting from the communication session established via the proxy server;
   querying the second database for a host name contained in the incomplete state message; and
   automatically updating the first database with an IP address corresponding to the host name contained in the incomplete state message, if the host name is present in the second database.

4. The method of claim 1, wherein initiating a communication session further comprises:
   monitoring a port number associated with the communication session; and
   concluding that messages in the communication session contain state information if the port number is reserved for secure communication.

5. The method of claim 4, wherein the port number is reserved for secure communication, and the concluding further comprises:
   performing a reverse Domain Name System (DNS) lookup of the destination IP address of the origin server in order to obtain a resulting symbolic name;
   querying the second database for the resulting symbolic name; and automatically updating the first database with the IP address of the origin server if the resulting symbolic name is present in the second database.

6. The method of claim 4, wherein the port number is reserved for secure communication, and the concluding further comprises:
performing a reverse DNS lookup of the IP address of the origin server in order to obtain a resulting symbolic name; and
automatically updating the second database with the resulting symbolic name.

7. The method of claim 4, wherein the port number is reserved for secure communication, and the concluding further comprises:
examining a client hello message transmitted while initiating the communication session;
extracting a domain name stored within a "server name" field of the client hello message; and
updating the second database with the extracted domain name.

8. The method of claim 1, further comprising:
receiving a 3xx status response from the origin server after the communication session has been established;
detecting a secure Uniform Resource Locator (URL) in a "location field" of the 3xx status response; and
updating the first database with the IP address of the origin server.

9. The method of claim 1, further comprising:
performing a deep packet inspection of a request header transmitted while initiating the communication session;
extracting a protocol stored in an "upgrade" field of the request header;
determining whether the extracted protocol can support a secure communication session; and
updating the first database with the destination IP address of the origin server.

10. The method of claim 1, further comprising:
monitoring responses from DNS lookups to detect canonical name (CNAME) responses and detect one or more IP addresses corresponding to the CNAME responses;
automatically updating the first database with the detected one or more IP addresses; and
automatically updating the second database with the detected CNAME response.

11. A system comprising:
at least one client device capable of initiating a communication session with an origin server;
a terminal configured, at least in part, to facilitate communication to/from the at least one client device over a first network, the terminal comprising:
a proxy routing unit,
a proxy communication unit,
a first database for storing a plurality of bypass IP addresses, and
a second database for storing symbolic names of a plurality of origin servers; and
a gateway for routing traffic to/from the terminal over the first network and to/from the origin server over a public network, the gateway comprising:
a proxy server configured to provide intermediary functions between the at least one client device and the origin server, and
at least one processor configured, at least in part, to manage routing operations and intermediary functions,
wherein the proxy routing unit is configured to:
determine if messages in the communication session contain state information associated with a secure session,
query the first database for an internet protocol (IP) address of the origin server, if the messages do not contain state information, the first database containing, at least in part, one or more bypass IP addresses,
establish the communication session directly with the origin server, via the gateway and the public network, if the messages contain state information or if the IP address of the origin server is present in the first database, and
automatically updating a second database with a symbolic name of the origin server if the communication session is established directly with the origin server, the second database containing, at least in part, one or more symbolic names,
wherein the proxy communication unit is configured to establish the communication session, via the proxy server and the public network, with the origin server if the messages do not contain state information and if the IP address of the origin server is not present in the first database, and
wherein the gateway is remotely located from the terminal.

12. The system of claim 11, wherein the proxy communication unit is further configured to:
query the second database for the symbolic name of the origin server; and
update the first database with the IP address of the origin server if the symbolic name is present in the second database.

13. The system of claim 11, wherein the proxy communication unit is further configured to:
detect an incomplete state message resulting from the communication session established via the proxy server;
query the second database for a host name contained in the incomplete state message; and
update the first database with an IP address corresponding to the host name contained in the incomplete state message, if the host name is present in the second database.

14. The system of claim 11, wherein the proxy routing unit is further configured to:
monitoring a port number associated with the communication session; and
conclude that messages in the communication session contain state information if the port number is reserved for secure communication.

15. The system of claim 14, wherein:
the port number is reserved for secure communication;
the terminal further comprises an address lookup and translation unit configured to perform a reverse DNS lookup of the destination IP address of the origin server in order to obtain a resulting symbolic name; and
the proxy routing unit is further configured to query the second database for the resulting symbolic name, and update the first database with the IP address of the origin server if the resulting symbolic name is present in the second database.

16. The system of claim 14, wherein:
the port number is reserved for secure communication;
the terminal further comprises an address lookup and translation unit configured to perform a reverse DNS lookup of the destination IP address of the origin server in order to obtain a resulting symbolic name; and the proxy routing unit is further configured to update the second database with the resulting symbolic name.

17. The system of claim 14, wherein the port number is reserved for secure communication, and proxy routing unit is further configured to:
examine a client hello message transmitted while initiating the communication session;
extract a domain name stored within a "server name" field of the client hello message; and
update the second database with the extracted domain name.

18. The system of claim 11, wherein the proxy communication unit is further configured to:
examine a 3xx status response from the origin server after the communication session has been established;
detect a secure Uniform Resource Locator (URL) in a "location field" of the 3xx status response; and
update the first database with the IP address of the origin server.

19. The system of claim 11, wherein the proxy communication unit is further configured to:
perform a deep packet inspection of a request header transmitted while initiating the communication session;
extract a protocol stored in an "upgrade" field of the request header;
determine whether the extracted protocol can support a secure communication session; and
update the first database with the destination IP address of the origin server.

20. The system of claim 11, wherein the terminal further comprises an address lookup and translation unit configured to:
maintain protocol conversion information for at least known origin servers;
monitor responses from DNS lookups to detect canonical name (CNAME) responses and detect one or more IP addresses corresponding to the CNAME responses;
update the first database with the detected one or more IP addresses; and
update the second database with the detected CNAME response.

* * * * *